United States Patent
O'Keefe et al.

(10) Patent No.: US 8,879,716 B2
(45) Date of Patent: Nov. 4, 2014

(54) INTELLIGENTLY ROUTING CALLS AND CREATING A SUPPORTING COMPUTER INTERFACE

(75) Inventors: Timothy Jude O'Keefe, Rochester, MN (US); Richard Allen Sit, Edina, MN (US)

(73) Assignee: International Business Machines Corporation, Armonk, NY (US)

( * ) Notice: Subject to any disclaimer, the term of this patent is extended or adjusted under 35 U.S.C. 154(b) by 2153 days.

(21) Appl. No.: 11/674,718

(22) Filed: Feb. 14, 2007

(65) Prior Publication Data

US 2008/0192908 A1  Aug. 14, 2008

(51) Int. Cl.
| H04M 3/00 | (2006.01) |
| H04M 5/00 | (2006.01) |
| H04M 3/523 | (2006.01) |
| H04M 3/51 | (2006.01) |
| H04M 7/00 | (2006.01) |

(52) U.S. Cl.
CPC .......... *H04M 3/5233* (2013.01); *H04M 3/5191* (2013.01); *H04M 7/006* (2013.01)
USPC ................................ 379/265.09; 379/265.12

(58) Field of Classification Search
CPC .......... H04M 2201/40; H04M 3/5175; H04M 3/5233; H04M 3/5237
USPC .............. 379/93.17, 265.09, 265.12, 266.01; 370/352; 709/203
See application file for complete search history.

(56) References Cited

U.S. PATENT DOCUMENTS

| 5,838,775 A | 11/1998 | Montalbano |
| 6,560,320 B1 | 5/2003 | Paleiov et al. |
| 6,754,693 B1 * | 6/2004 | Roberts et al. ................. 709/205 |
| 6,798,768 B1 * | 9/2004 | Gallick et al. ................. 370/352 |
| 6,871,212 B2 * | 3/2005 | Khouri et al. ................. 709/204 |
| 6,931,119 B2 * | 8/2005 | Michelson et al. ...... 379/265.13 |

(Continued)

FOREIGN PATENT DOCUMENTS

| EP | 1016998 A2 | 7/2000 |
| EP | 1030504 A2 | 8/2000 |
| EP | 1207674 A2 | 5/2002 |

OTHER PUBLICATIONS

Internet Services—netCAPTION, Caption First, http://www.captionfirst.com/internet.htm.

(Continued)

*Primary Examiner* — Nafiz E Hoque
(74) *Attorney, Agent, or Firm* — Matthew J. Bussan

(57) ABSTRACT

An enhanced mechanism for intelligently routing a call and providing a supporting computer interface on a screen of one or more computers connected to a network. In an embodiment, a service request form is provided on a customer's computer by which a customer provides customer-input information. A data file (e.g., an XML file) is generated with the customer-input information and transmitted over a data network. A service routing, integration, mining and personalization (SRIMP) engine receives, via the data network, the data file. The SRIMP engine routes a call (e.g., a VoIP call) to a customer care agent selected based on the data file. In addition, the SRIMP engine creates an agent's view computer interface the content of which is based on the data file. The SRIMP engine may, for example, send personalized information and portlets to the selected agent's browser that are needed to address the customer's question. The SRIMP engine may also create a customer's view computer interface the content of which is based on the data file.

12 Claims, 7 Drawing Sheets

(56) References Cited

U.S. PATENT DOCUMENTS

| | | | |
|---|---|---|---|
| 7,783,755 B2 * | 8/2010 | Goss et al. | 709/225 |
| 8,438,314 B2 * | 5/2013 | Bateman et al. | 710/5 |
| 2002/0107906 A1 * | 8/2002 | Brockbank | 709/203 |
| 2003/0017824 A1 | 1/2003 | Uhlmann | |
| 2003/0129968 A1 | 7/2003 | Earl | |
| 2003/0234815 A1 * | 12/2003 | Delaney | 345/762 |
| 2006/0056599 A1 | 3/2006 | Cragun | |
| 2007/0116237 A1 * | 5/2007 | Katkam et al. | 379/265.01 |

OTHER PUBLICATIONS

Speaker Image Services, Caption First, http://www.captionfirst.com/speaker_image.htm.

Explain Video Relay, AT&T Knowledge Ventures, 2006, http://www.consumer.att.com/relay/video/what.html.

* cited by examiner

FIG. 3

INTELLIGENTLY ROUTING CALLS AND CREATING A SUPPORTING COMPUTER INTERFACE

BACKGROUND OF THE INVENTION

1. Field of Invention

The invention relates in general to the digital data processing field. More particularly, the invention relates to a mechanism for intelligently routing calls and creating a supporting two-way personalized and dynamic web-based computer interface.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

As computer systems grow faster, store more data, and provide more applications to their users, convergence with other fields such as telephony becomes inevitable. While the basic unit of information exchange in telephony—a telephone conversation—has not changed, the technology we use to place telephone calls, however, has evolved (and continues to evolve) rapidly. Examples of convergence include interactive telephone systems, generally known as Interactive Voice Response (IVR) systems, as well as computer systems and telephony devices enabled with Voice-Over-Internet (VoIP) telephony.

IVR systems have achieved very broad use in businesses and particularly in telephone-based services. A user phoning into such a system receives a computer-generated voice prompt and responds with voice inputs or by pressing an appropriate key or keys of the telephone. Pressing the telephone key or keys generates standard Dual-Tone Multi-Frequency (DTMF) signals, which are received by the IVR. The user input can lead to additional voice prompts and responses, continuing until the IVR has received all of the information it is programmed to solicit.

Anyone who has interacted with IVRs of this sort is aware of their shortcomings and the frustration that they can cause. Generally, at each stage of the interaction, the user must listen to an entire menu of choices. The process is time-consuming and requires that the user remember which key will invoke the desired choice. Because of the limitations of this interactive model, the user must navigate linearly from one stage to the next in a rigid, pre-programmed branching structure. There is generally no choice but to return to the beginning if it turns out that the user has chosen the wrong branch at some stage. Verification of the user's input is proved by time-consuming voice playback. The user can generally correct errors, when they occur, only by repeating the entire erroneous entry.

U.S. Pat. No. 6,560,320 B1, entitled "ADAPTABLE SUBSCRIBER UNIT FOR INTERACTIVE TELEPHONE APPLICATIONS", issued on May 6, 2003 to Paleiov et al., and assigned to IBM Corporation, discloses a method for telephonic communication that addresses some of the shortcomings of IVRs. The Paleiov et al. patent discloses a protocol that defines a relation between predetermined graphic elements and respective sequences of DTMF signals. A screen to be displayed on a telephone subscriber unit is designed to include one or more of the graphical elements. An encoded representation of the screen is then generated using DTMF signals in accordance with the protocol. The encoded representation is transmitted over a telephone line to the telephone subscriber unit, whereby the one or more graphic elements are displayed by the subscriber unit responsive to the encoded representation of the screen. While the Paleiov et al. patent addresses some of the shortcomings of IVRs, other shortcomings of current telephone applications are not addressed. For example, the customer's call is not necessarily routed to an appropriate Customer Care Agent (CCA). Moreover, the CCA to whom the call is routed is provided with a conventional screen that is rigid and pre-programmed, i.e., not responsive to the input at the subscriber unit. The telephonic communication method disclosed in the Paleiov et al. patent, like other current telephone applications, does not allow the users (e.g., the customer and the CCA) to quickly transfer files or input text information that can be viewed and interacted with by a person or system at the other end of the call.

Therefore, a need exists for an enhanced mechanism for routing calls and creating a supporting computer interface.

SUMMARY OF THE INVENTION

According to the preferred embodiments of the invention, a service routing, integration, mining and personalization (SRIMP) engine provides intelligent call routing and a supporting computer interface on a screen of one or more computers connected to a network. A service request form is provided on a customer's computer by which a customer provides customer-input information. A data file (e.g., an XML file) is generated with the customer-input information and transmitted over a data network. The SRIMP engine receives the data file via the data network and routes a call (e.g., a VoIP call) to a customer care agent selected based on the data file. In addition, the SRIMP engine creates an agent's view computer interface the content of which is based on the data file for display on a screen of the selected agent's computer. The SRIMP engine may, for example, send personalized information and portlets to the selected agent's browser that are needed to address the customer's question.

According to another aspect of the preferred embodiments of the invention, the SRIMP engine may also create a customer's view computer interface the content of which is based on the data file and agent-input information for display on a screen of the customer's computer. The SRIMP engine may, for example, send personalized information and portlets to the customer's browser to address the customer's question. The customer's view computer interface may, for example, include a call log that is editable by the customer care agent and read-only by the customer.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the invention will hereinafter be described in conjunction with the appended drawings, where like designations denote like elements.

FIG. 3 is an illustrative example of a customer's view graphical user interface screen and an agent's view graphical user interface screen, each of which displays several portlets in accordance with the preferred embodiments of the present invention.

DETAILED DESCRIPTION OF THE PREFERRED EMBODIMENTS 1.0 Overview

In accordance with the preferred embodiments of the invention, a service routing, integration, mining and personalization (SRIMP) engine provides intelligent call routing and a supporting computer interface on a screen of one or more computers connected to a network. A service request form is provided on a customer's computer by which a customer provides customer-input information. A data file (e.g., an XML file) is generated with the customer-input information and transmitted over a data network. The SRIMP engine receives the data file via the data network and routes a call (e.g., a VoIP call) to a customer care agent selected based on the data file. In addition, the SRIMP engine creates an agent's view computer interface the content of which is based on the data file for display on a screen of the selected agent's computer. The SRIMP engine may, for example, send personalized information and portlets to the selected agent's browser that are needed to address the customer's question.

In accordance with another aspect of the preferred embodiments of the invention, the SRIMP engine may also create a customer's view computer interface the content of which is based on the data file and agent-input information for display on a screen of the customer's computer. The SRIMP engine may, for example, send personalized information and portlets to the customer's browser to address the customer's question. The customer's view computer interface may, for example, include a call log that is editable by the customer care agent and read-only by the customer.

2.0 Detailed Description

Figure 1:
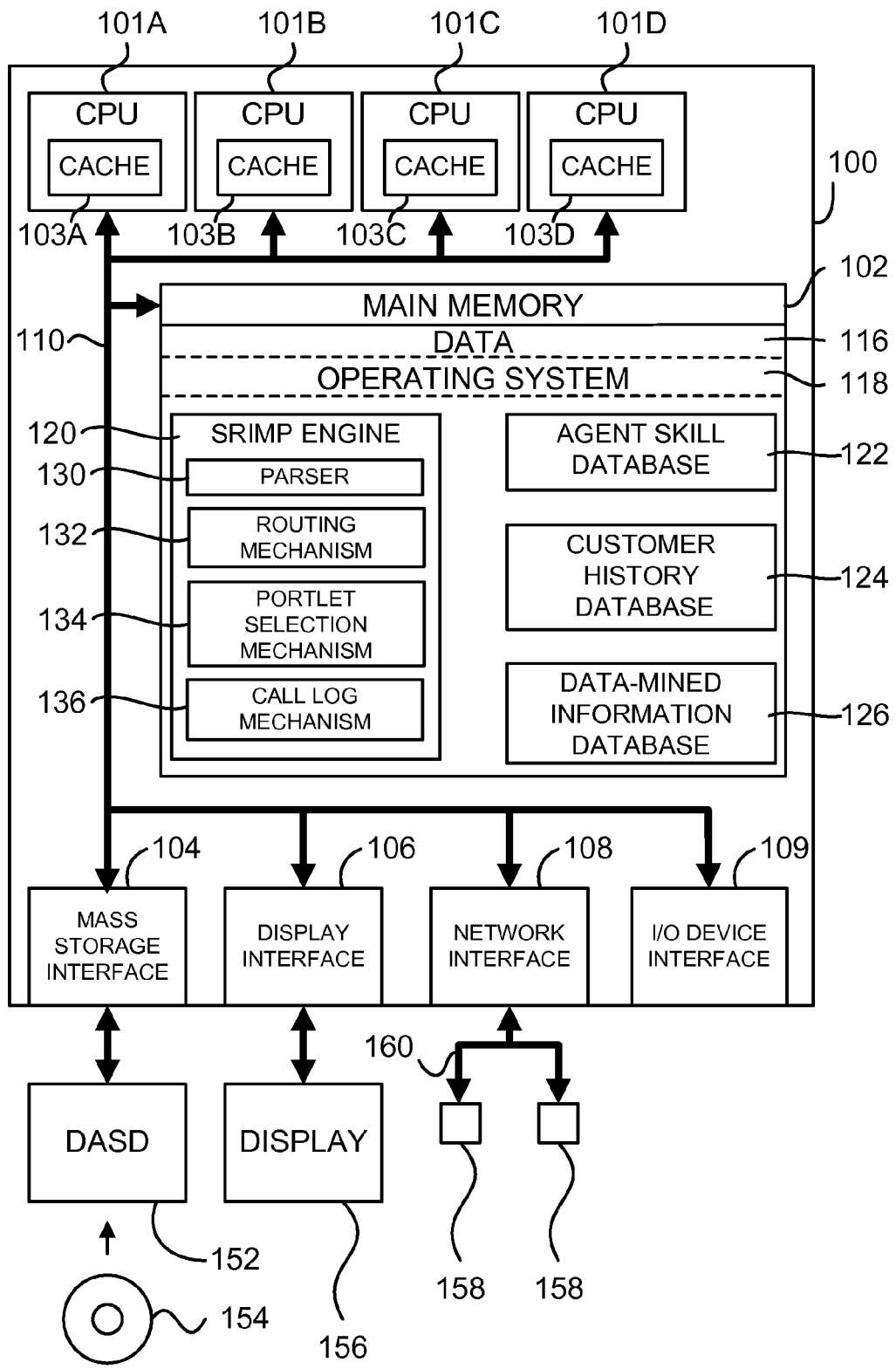
FIG. 1 is a block diagram of a computer system for intelligently routing calls and creating a supporting computer interface in accordance with the preferred embodiments of the invention.

A computer system implementation of the preferred embodiments of the invention will now be described with reference to FIG. 1 in the context of a particular computer system 100, i.e., an IBM eServer iSeries or System i computer system. However, those skilled in the art will appreciate that the method, apparatus, system, and computer program product of the invention apply equally to any computer system, regardless of whether the computer system is a complicated multi-user computing apparatus, a single user workstation, a PC, or an embedded control system. As shown in FIG. 1, computer system 100 comprises a one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software. In addition, in accordance with the preferred embodiments, main memory 102 includes a service routing, integration, mining and personalization (SRIMP) engine 120, an agent skill database 122, a customer history database 124, and a data-mined information database 126, all of which may in various embodiments exist in any number. Although the SRIMP engine 120, the agent skill database 122, the customer history database 124, and the data-mined information database 126 are all illustrated as being contained within the main memory 102, in other embodiments some or all of them may be on different electronic devices (e.g., one or more of the databases 122, 124 and 126 may be on direct access storage device 152) and may be accessed remotely (e.g., via the network 160).

The exemplary SRIMP engine 120 includes a parser 130, a routing mechanism 132, a portlet selection mechanism 134, and a call log mechanism 136. The SRIMP engine 120 and its component parts, i.e., the parser 130, the routing mechanism 132, the portlet selection mechanism 134, and the call log mechanism 136, are preferably implemented as computer program instructions. For example, the parser 130 is preferably implemented as computer program instructions that parse an extensible markup language (XML) file. As discussed below in detail, an XML file is presented to the SRIMP engine 120 from a customer computer via a data network (e.g., via the network 160). The XML file is generated with the customer-input information, such as the customer's question, web page navigation history, name, address, telephone number, product identifier, service identifier, account number, account type, service level, credit card number, and debit card number. The parser 130 retrieves the elements of the XML file and places them in a data structure more useful for data processing by the SRIMP engine 120.

As discussed in more detail below, in accordance with the preferred embodiments of the invention, the SRIMP engine 120 analyzes the parsed customer data and routes a call to a customer care agent who can handle the specific customer question. The SRIMP engine 120 correlates one or more elements of the parsed customer data, such as the customer's question, to match skills of agents stored in the agent skill database 122. For example, the customer's question may relate to her Individual Retirement Account (IRA) account in which case the SRIMP engine 120 would match skills of agents stored in the agent skill database 122 to identify one or more customer care agents who specialize in handling questions related to IRA accounts. The SRIMP engine 120 selects one of these identified customer care agents, preferably the most-qualified agent, and routes a call (e.g., a VoIP call) to him or her.

In accordance with the preferred embodiments of the invention, the routing mechanism 132 of the SRIMP engine 120 routes a call to the selected customer care agent using VoIP technology that employs techniques that are conventional and well known in the art. The routing mechanism 132 may additionally route personalized information and portlets to the selected customer care agent's web browser, as well as routing personalized information and portlets to the customer's web browser.

In addition, data from sources other than the parsed customer data may be used to match skills of agents stored in the agent skill database 122. For example, data from another database, such as the customer history database 124, may be used in addition to the parsed customer data. In an illustrative example, the parsed customer data may indicate that the customer has an IRA account, and the data from the customer history database 124 may indicate that this particular customer's IRA account has a high balance that requires her question to be handled by a special "platinum" service-level customer care agent. In this illustrative example, the SRIMP engine 120 would match skills of agents stored in the agent skill database 122 to identify one or more customer care agents who are trained at the "platinum" service-level and who specialize in handling questions related to IRA accounts. The SRIMP engine 120 selects one of these identified customer care agents, preferably the most-qualified agent, and routes a call (e.g., a VoIP call) to him or her.

The SRIMP engine 120 generates a query based on the parsed customer data, and optionally other data, and performs the query against the agent skill database 122. In this regard, the SRIMP engine 120 may provide at least a portion of the functionality of a database management system (DBMS), or the SRIMP engine 120 may utilize a DBMS (not shown) to perform the query against the agent skill database 122. In either case, the query is performed using techniques that are conventional and well known in the art, e.g., the query may be performed using a query access plan created by a query optimizer.

In accordance with the preferred embodiments of the invention, the SRIMP engine 120 also sends personalized information and portlets to the customer care agent's browser that are needed to address the specific customer question. The portlet selection mechanism 134 of the SRIMP engine 120 selects one or more portlets relevant to the customer's question from among a plurality of portlets. For example, the portlet selection mechanism 134 may select a set of portlets necessary to answer a customer's question about withdrawing money from an existing IRA account and a different set of portlets necessary to answer a customer's question about opening a new IRA account. The SRIMP engine 120 integrates the selected portlets and one or more elements of the parsed customer data, along with any relevant customer history data stored in the customer history database 124 and/or any relevant data-mined information stored in the data-mined information database 126, to provide an agent's view computer interface. For example, the routing mechanism 132 may route this information to the selected customer care agent's web browser for display on his or her computer screen.

Similarly, the SRIMP engine 120 may also send personalized information and portlets to the customer's browser. The portlet selection mechanism 134 selects one or more portlets relevant to the customer's question from among a plurality of portlets. In a first illustrative example, the portlet selection mechanism 134 may select a set of one or more portlets necessary to answer a customer's question about withdrawing money from an existing IRA account. In this first illustrative example, the portlet selection mechanism 134 may also select one or more additional portlets related to one or more elements of the parsed customer data, e.g., one or more portlets advertising products and/or services that may be purchased with proceeds from the customer's withdrawal. In a second illustrative example, the portlet selection mechanism 134 may select a different set of one or more portlets necessary to answer a customer's question about opening a new IRA account. In this second illustrative example, the portlet selection mechanism 134 may also select one or more additional portlets related to one or more elements of the parsed customer data, e.g., one or more portlets advertising other types of accounts that the customer may be interested in opening. The one or more additional portlets may, for example, be selected by the portlet selection mechanism 134 based on a match against data stored in a database, such as the data-mined information database 126.

In accordance with the preferred embodiments of the invention, portlets are used to display multiple areas (i.e., portlet windows) on the screen of the customer care agent's computer and/or the customer's computer. Portlets, which are conventional and well known in the art, produce markup code fragments that are aggregated into a portal page. Typically, a portal page is displayed on a screen as multiple non-overlapping portlet windows, each displaying a portlet. Although the use of portlets is the preferred way to display multiple areas on the screen, one skilled in the art will appreciate that other technology that can send information to separate areas of the screen may be utilized within the scope of the invention. For example, frames may be used to accomplish the same type of multiple area display on the screen.

The SRIMP engine 120 integrates the selected portlets and one or more elements of the parsed customer data, along with any relevant customer history data stored in the customer history database 124 and/or any relevant data-mined information stored in the data-mined information database 126, to provide a customer's view computer interface. For example, the routing mechanism 132 may send this information to the customer's web browser for display on her computer screen.

In general, while the preferred embodiments of the invention are described in conjunction with the use of a web browser on the customer's computer and the customer care agent's computer, any client server application may be used to implement the invention. For example, the customer may be an employee who is using some installed client software and needs help with something. The customer care agent could have his or her own installed client software and use the SRIMP engine to help the employee.

In accordance with the preferred embodiments of the invention, the agent's view computer interface and the customer's view computer interface each have one or more portlets, with each portlet having textual, graphic, audio, and video media, or any combination thereof. Preferably, one of the portlets selected for the agent's view computer interface and/or the customer's view computer interface is a call log. The call log mechanism 136 records the input of the customer and/or selected customer care agent, and provides this information for presentation in the call log portlet. Although FIG. 1 illustrates the call log mechanism 136 as being included in the SRIMP engine 120, the call log mechanism 136 may be kept elsewhere. The call log preferably is editable by the customer care agent and read-only by the customer.

The customer history database 124 stores customer history data for each of a plurality of customers. The SRIMP engine 120 matches one or more elements of the parsed customer data, such as the customer's name and/or account number, to corresponding historic customer data stored in customer history database 124. Once a match is found, the SRIMP engine 120 may utilize relevant customer history data associated with the match in one or more of the portlets. For example, the SRIMP engine 120 may match the customer's name and insurance policy number, and then in one or more of the portlets present details of that customer's insurance coverage under that policy.

The data-mined information database 126 stores data-mined information obtained via a data-mining operation. The SRIMP engine 120 matches one or more elements of the parsed customer data, such as the customer's question, to corresponding data-mined information stored in the data-mined database 126. Once a match is found, the SRIMP engine may utilize relevant data-mined information associated with the match in one or more of the portlets. In one illustrative example, the SRIMP engine 120 may match the customer's question, and then in one or more of the portlets present information relevant to the customer's question, e.g., one portlet in the agent's view may present the data-mined information "80% of customers had this question answered when provided with document XYZ" and one portlet in the customer's view may present "document XYZ". In another illustrative example, one portlet in the agent's view may present the data-mined information "10% of customers having this question are likely to respond to advertisement ABC" and one portlet in the customer's view may present "advertisement ABC".

In the preferred embodiments of the invention, the SRIMP engine 120 and its component parts, i.e., the parser 130, the routing mechanism 132, the portlet selection mechanism 134, and the call log mechanism 136, include instructions capable of executing on the processors 101 or statements capable of being interpreted by instructions executing on the processors 101 to perform the functions as further described below with reference to FIGS. 4-7. In another embodiment, the SRIMP engine 120 and its component parts may be implemented in hardware via logic gates and/or other appropriate hardware techniques in lieu of, or in addition to, a processor-based system.

While the component parts of SRIMP engine 120 are shown separate and discrete from each other in FIG. 1, the preferred embodiments expressly extend to implementing one or more of the component parts within one or more of the other component parts. In addition, the SRIMP engine 120 and its component parts may be implemented in the operating system 118 or application software, utilities, or other types of software within the scope of the preferred embodiments.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, SRIMP engine 120, agent skill database 122, customer history database 124, and data-mined information database 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as OS/400 or IBM i5/OS; however, those skilled in the art will appreciate that the spirit and scope of the invention is not limited to any one operating system.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the invention may be practiced using a computer system that has a different number of processors and/or multiple buses. In addition, the interfaces that are used in the preferred embodiments each include separate, fully programmed microprocessors that are used to off-load computer-intensive processing from processors 101. However, those skilled in the art will appreciate that the invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD ROM drive, which may store data to and read data from a CD ROM 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems 158 to computer system 100 across a network 160. In accordance with the preferred embodiments of the invention, the other computer systems 158 to which computer system 100 is connected include computer systems, workstations, and/or telephony devices (e.g., a VoIP enabled telephone) of the customer and/or the customer care agent. An illustrative example of such a networked system is discussed below with reference to FIG. 2. The invention applies equally no matter how computer system 100 may be connected to other computer systems 158, regardless of whether the network connection 160 is made using present-day analog and/or digital techniques, wire line or wireless, or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while this embodiment of the invention has been and will be described in the context of a fully functional computer system, those skilled in the art will appreciate that the invention is capable of being distributed as a program product in a variety of forms, and that the invention applies equally regardless of the particular type of signal bearing media used to actually carry out the distribution. Examples of suitable signal bearing media include: recordable type media such as floppy disks and CD ROMs (e.g., CD ROM 154 of FIG. 1), and transmission type media such as digital and analog communications links (e.g., network 160 in FIG. 1).

Figure 2:
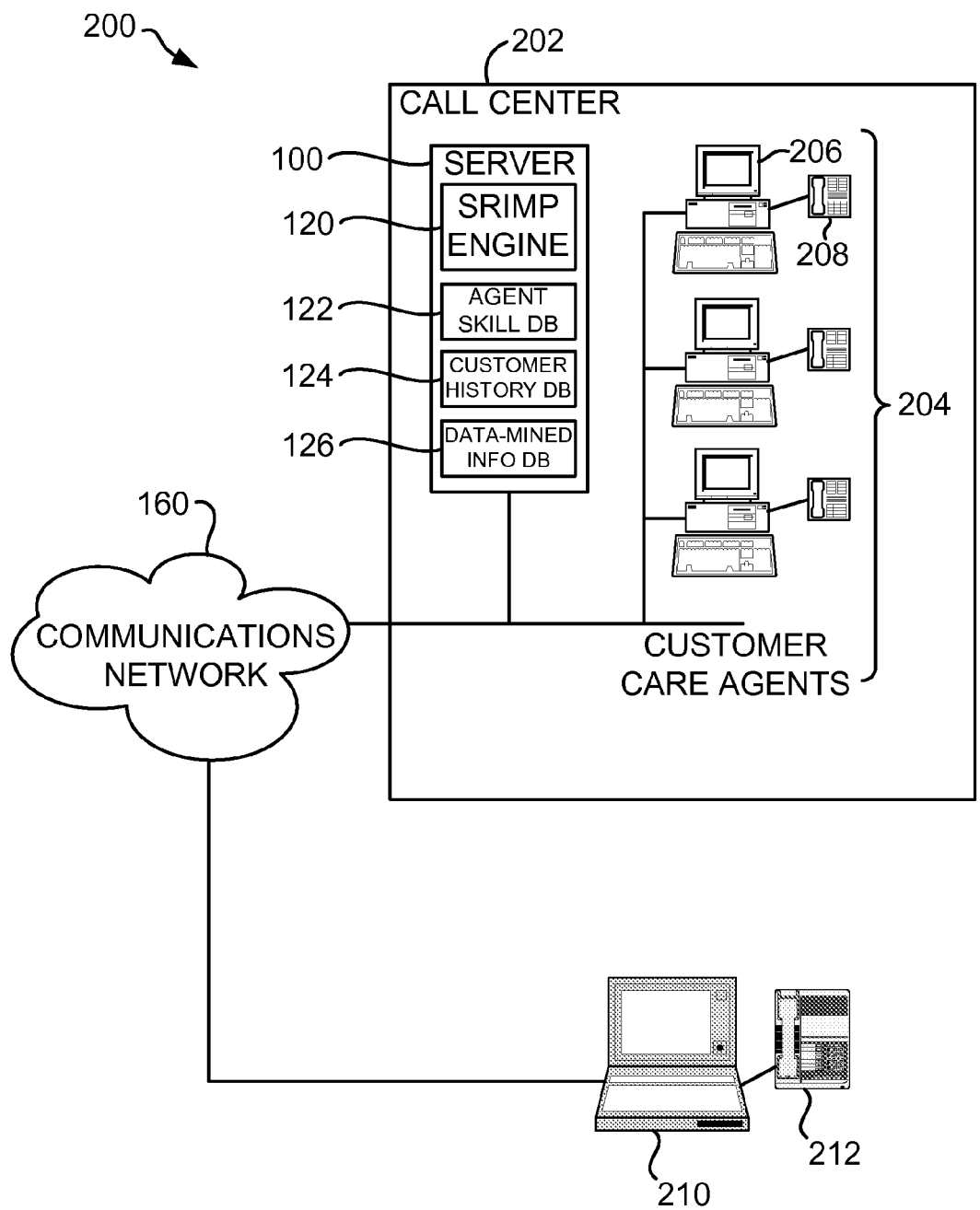
FIG. 2 is a schematic illustration of a networked system for intelligently routing calls and creating a supporting computer interface in accordance with the preferred embodiments of the invention.

FIG. 2 is a schematic illustration of a networked system 200 for intelligently routing calls and creating a supporting computer interface in accordance with the preferred embodiments of the invention. Note, however, that the networked system 200 illustrates a general environment in which the preferred embodiments of the invention may be implemented. Moreover, emerging technologies, such as VoIP, continue to reshape the modern telecommunications landscape. Accordingly, the environment depicted in FIG. 2 is meant to be illustrative of a telecommunication environment that provides a framework for the preferred embodiments of the invention, and should not, therefore, be considered in any way to limit the invention to the illustrated environment.

The networked system 200 shown in FIG. 2 includes a call center 202. Generally, a call center is used to place and receive telephone calls for the purposes of telemarketing, sales, customer support, or other business related activity. The call center 202 may support anywhere from a small number to many hundreds of customer care agents (CCAs) 204 who handle calls to relay business information. In FIG. 2, three customer care agents 204 are illustrated, each represented by a computer 206 and a VoIP enabled telephone 208.

Unlike the prior art where a customer places a call to a phone number associated with a business entity that is handled by a call center; in accordance with the preferred embodiments of the invention, a customer drills down in the business entity's website looking for an answer to a specific question, clicks on a button to open a request prompt (e.g., a service request form), provides customer-input information in response to the request prompt (e.g., fills in the request form with basic information about herself and her specific question), clicks on a "submit" button that causes a data file (e.g., an XML file) to be generated with the customer-input information and sends the data file over communications network 160 to the SRIMP engine 120 of the server 100. The SRIMP engine 120 then analyzes the data file, selects an appropriate customer care agent 204 who can handle the customer's specific question using the agent skill database 122, and routes a call to the selected customer care agent 204. Once the call is routed to the selected customer care agent 204, two-way verbal communication may be established between the selected customer care agent using the VoIP telephone 208 and the customer using a VoIP enabled telephone 212 through conventional and well known VoIP technology.

Hence, the preferred embodiments of the present invention advantageously eliminate the use of phone menus in routing a call to a customer care agent.

In certain situations it may be desirable for the SRIMP engine 120 to capture a voice-to-text version of the two-way verbal communication. In such situations, before the two-way verbal communication begins, the SRIMP engine 120 presents the customer with an audio message informing the customer that the conversation may be recorded. Certain states require such a notification to be made prior to a conversation being recorded.

In addition, the SRIMP engine 120 sends personalized information and portlets that are needed to address the customer's specific question to the web browser on selected customer care agent's computer 206. Similarly, the SRIMP engine 120 may send personalized information and portlets addressing the customer's question to the web browser on the customer's computer 210. Hence, a two-way dynamic web-based interface between the customer and the selected customer care agent 204 is presented.

Preferably, the customer sees any information the agent allows (e.g., a call log with the text of the customer's question) and the agent sees anything the customer does within the interface. Information (e.g., screen view and customer-input information) in the form of XML data is quickly transmitted (e.g., via Asynchronous JavaScript and XML (AJAX) technology) to the SRIMP engine 120. The SRIMP engine 120 constantly updates the customer history stored in the customer history database 124 and the relevant data-mined information stored in the data-mined information database 126, as well as determining the appropriate portlets to display.

Therefore, in accordance with the preferred embodiments of the invention, a simultaneous dynamic two-way visual and auditory exchange of information is provided, through VoIP and the SRIMP engine 120, between the customer and the selected customer care agent as they discuss the customer's question and the agent's answers. The SRIMP engine 120 continues to update the computer interface throughout the call.

In order to increase the productivity of the selected customer care agent, the agent may handle several customers simultaneously on plural screens (e.g., one screen per customer), or on a single screen (e.g., one or more portlets per customer simultaneously displayed on the same screen, or one or more portlets per customer sequentially displayed on the same screen).

Figure 3:
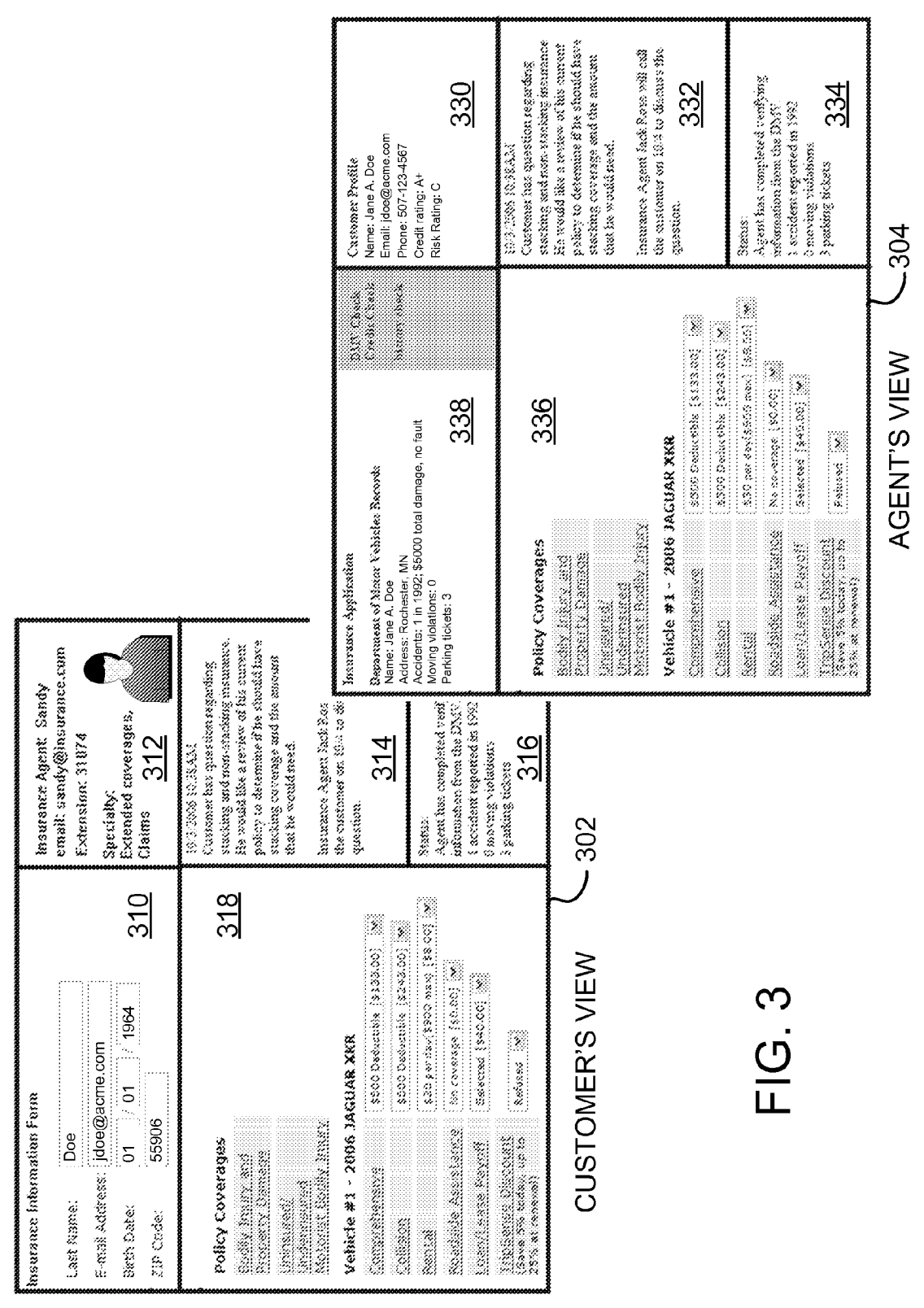

FIG. 3 is an illustrative example of a customer's view graphical user interface screen 302 and an agent's view graphical user interface screen 304, each of which displays several portlets in accordance with the preferred embodiments of the present invention. The customer's view graphical user interface 302 and the agent's view graphical user interface 304 are meant to be illustrative and provide a framework for the preferred embodiments of the invention, and should not, therefore, be considered in any way to limit the invention to the illustrated interfaces. For example, one skilled in the art will appreciate that the content, number and arrangement of the portlets may be varied.

The exemplary computer interface shown in FIG. 3 presents information relating to auto insurance. The auto insurance information presented in the exemplary computer interface is meant to be illustrative and provide a framework for describing the preferred embodiments of the invention, and should not, therefore, be considered in any way to limit the invention to the illustrated subject matter. One skilled in the art will appreciate that the computer interface may present information relating to any subject matter.

The customer's view graphical user interface 302 includes an "Insurance Information Form" portlet 310, an "Insurance Agent Contact Information" portlet 312, a "Call Log" portlet 314, a "Status or Notification" portlet 316, and a "Web Site Content" portlet 318. The "Insurance Information Form" portlet 310 presents the customer-input information that the customer previously entered in the service request form and sent to the SRIMP engine by clicking the submit button. The "Insurance Agent Contact Information" portlet 312 presents contact information of the selected customer care agent to whom the SRIMP engine routed a call. In accordance with the preferred embodiments of the invention, at least a portion of the contact information (e.g., "Specialty: Extended coverages, Claims") may be provided by the SRIMP engine through access to the agent skill database. The "Call Log" portlet 314 presents a log of the call between the customer and the selected customer care agent, which is preferably editable for the agent and read-only for the customer. In accordance with the preferred embodiments of the invention, at least a portion of the log may be provided by the SRIMP engine through voice-to-text capture. Alternatively, or in addition, at least a portion of the log may be provided by the SRIMP engine through agent input. The "Status or Notification" portlet 316 presents status and notification information relative to actions the selected customer care agent has completed during the call. In accordance with the preferred embodiments of the invention, at least a portion of the status and notification information may be provided by the SRIMP engine automatically monitoring the actions of the selected customer care agent. Alternatively, or in addition, at least a portion of the status and notification information may be provided by the SRIMP engine through agent input. The "Web Site Content" portlet 318 presents content from the company's website. In accordance with the preferred embodiments of the invention, relevant website content is provided by the SRIMP engine and may include an input mechanism by which the customer and/or agent may make selections and/or provide information.

The agent's view graphical user interface 304 includes a "Customer Profile" portlet 330, a "Call Log" portlet 332, a "Status or Notification" portlet 334, a "Web Site Content" portlet 336, and an "Insurance Applications" portlet 338. The "Customer Profile" portlet 330 presents customer history information for the use of the customer care agent. In accordance with the preferred embodiments of the invention, at least a portion of the customer history information presented in the "Customer Profile" portlet 330 is provided by the SRIMP engine through access to the customer history database. The "Call Log" portlet 332 in the agent's view corresponds to the "Call Log" portlet 314 in the customer's view. Similarly, the "Status or Notification" portlet 334 in the agent's view corresponds to the "Status or Notification" portlet 316 in the customer's view. The "Web Site Content" portlet 336 in the agent's view corresponds to the "Web Site Content" portlet 318 in the customer's view. The "Insurance Applications" portlet 338 provides one or more applications from which the customer care agent may select and utilize to address the customer's question. In this particular example, the customer care agent may select among the applications "DMV Check", "Credit Check", and "History Check". Here, the customer care agent has utilized the "DMV Check" application to verify information from the DMV. The agent's action in this regard may be among those reflected in the "Status or Notification" portlets 316 and 334.

One skilled in the art will appreciate that additional portlets, such as instant messaging, may be added to the customer's view graphical user interface 302 and/or the agent's view graphical user interface 304. Also, the portlets may have different read/write/view access depending on various factors, such as the selected customer care agent's role and/or the company's policies.

Figure 4:
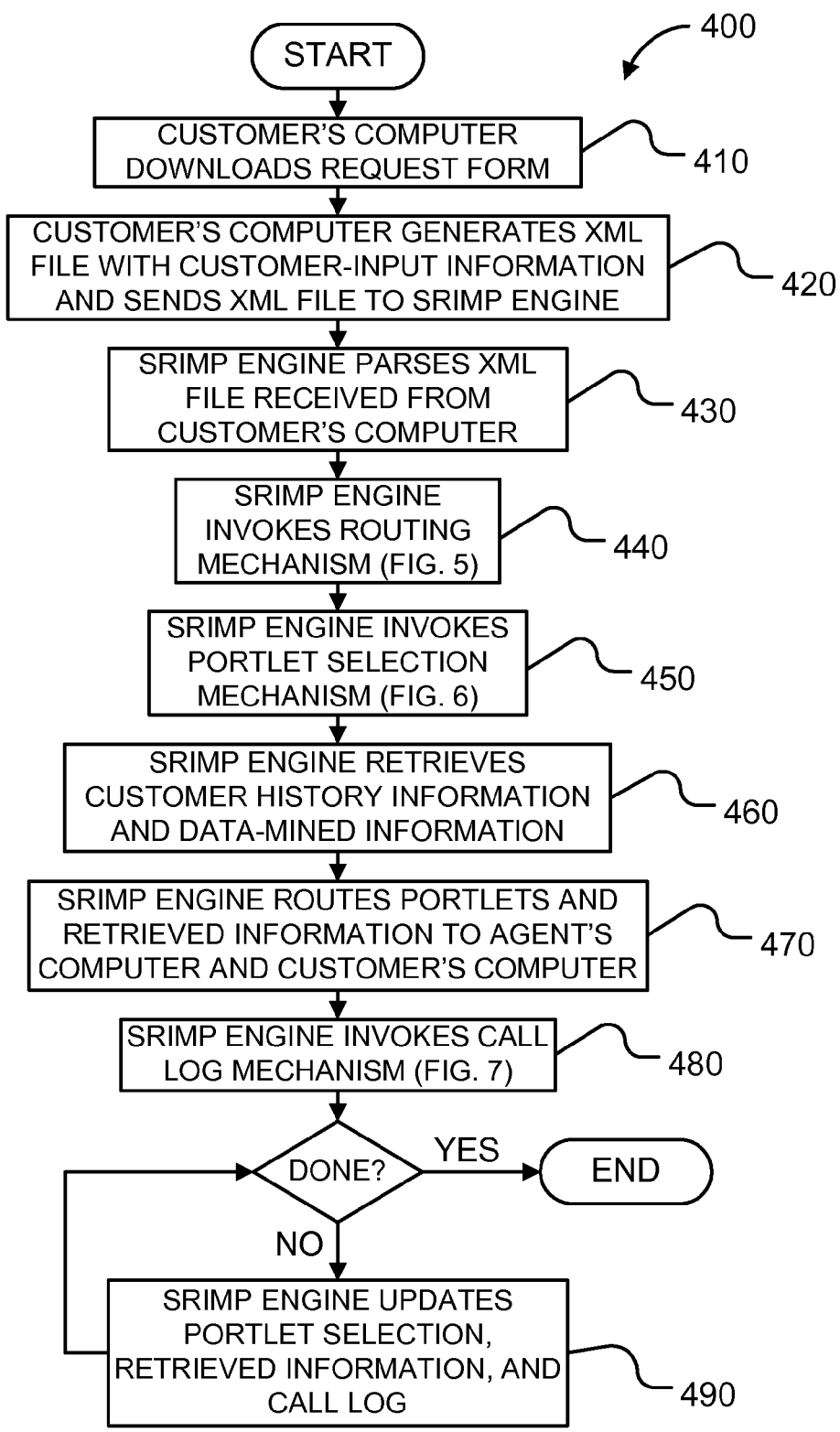
FIG. 4 is a flow diagram illustrating a method for intelligently routing calls and creating a supporting computer interface in accordance with the preferred embodiments of the invention.

FIG. 4 is a flow diagram illustrating a method 400 for intelligently routing calls and creating a supporting computer interface in accordance with the preferred embodiments of the invention. In the method 400, the steps discussed below (steps 410-490) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 400 begins as the customer's computer downloads a request form (step 410). The request form may, for example, be downloaded to a web browser on the customer's computer in response to the customer having clicked an "open request form" button on a webpage that the customer navigated to by drilling down in a company's website. In addition to the request form, the customer's computer may download additional items, such as a VoIP plug-in that enables the customer's computer to handle VoIP calls and/or an information gathering mechanism that enables the customer's computer to gather relevant information from the customer and/or the customer's computer. For example, the information gathering mechanism may work in conjunction with one or more other programs resident on the customer's computer (e.g., a diagnostic program that provides a computer service error report).

Then, the method 400 continues as the customer's computer generates an XML file with customer-input information and sends the XML file to the SRIMP engine (step 420). The XML file may, for example, be generated in response to the customer having clicked a "submit" button on the request form that the customer has just filled-in. In general, the XML file is generated by the customer's computer based on customer-input information, such as the information the customer has provided via the request form and/or information the customer or the customer's computer has provided via some other mechanism, e.g., the information gathering mechanism. Such information may include, without limitation, computer configuration information, a cookie from previous browser sessions, or information extracted from a document on the customer's computer such as a case file. Accordingly, for purposes of the invention, "customer-input information" includes information gathered from the customer as well as information gathered from the customer's computer. An XML file is generated in accordance with the preferred embodiments of the invention. One skilled in the art will appreciate, however, that any type of data file may be generated and sent in step 420.

Next, the method 400 continues as the SRIMP engine receives the XML file from the customer's computer and parses the XML file (step 430). Preferably, the XML file is parsed into one or more component parts, e.g., the customer's question, web page navigation history, name, address, telephone number, product identifier, service identifier, account number, account type, service level, credit card number, debit card number, and the like.

The method 400 continues when the SRIMP engine invokes the routing mechanism (step 440), which is described below with reference to FIG. 5. The SRIMP engine invokes the routing mechanism to route a call (e.g., a VoIP call) to a customer care agent who is selected based on one or more component parts of the parsed XML file (e.g., the customer's question or one or more key word hits in the customer's question, the customer's account type, etc.).

Then, the method 400 continues as the SRIMP engine invokes the portlet selection mechanism (step 450), which is described below with reference to FIG. 6. The SRIMP engine invokes the portlet selection mechanism to select one or more portlets and to integrate the selected portlet(s) for display on the screen of the selected customer care agent's computer. In addition, the SRIMP engine may invoke the portlet selection mechanism to select one or more portlets and to integrate the selected portlet(s) for display on the screen of the customer's computer. Preferably, the selection of the one or more portlets is based at least in part on one or more component parts of the parsed XML file. For example, the set of portlets shown in FIG. 3 may be selected when the customer's question relates to auto insurance, but a different set of portlets may be selected when the customer's question relates to home owner's insurance.

The method 400 then continues as the SRIMP engine also retrieves relevant customer history information from the customer history database and relevant data-mined information from the data-mined information database (step 460). Preferably, the selection of the relevant customer history information and the relevant data-mined information is based at least in part on one or more component parts of the parsed XML file. For example, the SRIMP engine may retrieve relevant customer history, such as the customer's "Credit Rating: A+" and customer's "Risk Rating: C" presented in the "Customer Profile" portlet shown in FIG. 3, based at least in part on one or more component parts of the parsed XML file (e.g., the customer's name, the customer's e-mail address, etc.). In another example, the SRIMP engine may retrieve relevant data-mined information, such as "80% of customer's had this question answered when provided with document XYZ", based at least in part on one or more component parts of the parsed XML file (e.g., the customer's question).

Next, the method 400 continues as the SRIMP engine routes the selected portlet(s) and retrieved information (e.g., the relevant customer history information and the relevant data-mined information) to the agent's computer and the customer's computer (step 470). Then, the method 400 continues as the SRIMP engine invokes the call log mechanism (step 480), which is described below with reference to FIG. 7. The method 400 then determines if the call is done. If the call is done, the method 400 ends. If the call is not yet done, the method 400 continues by updating the selection of portlets, the retrieved information, and the call log (step 490). Preferably, the SRIMP engine also constantly updates the customer history information stored in the customer history database and the data-mined information stored in the data-mined information database.

Figure 5:
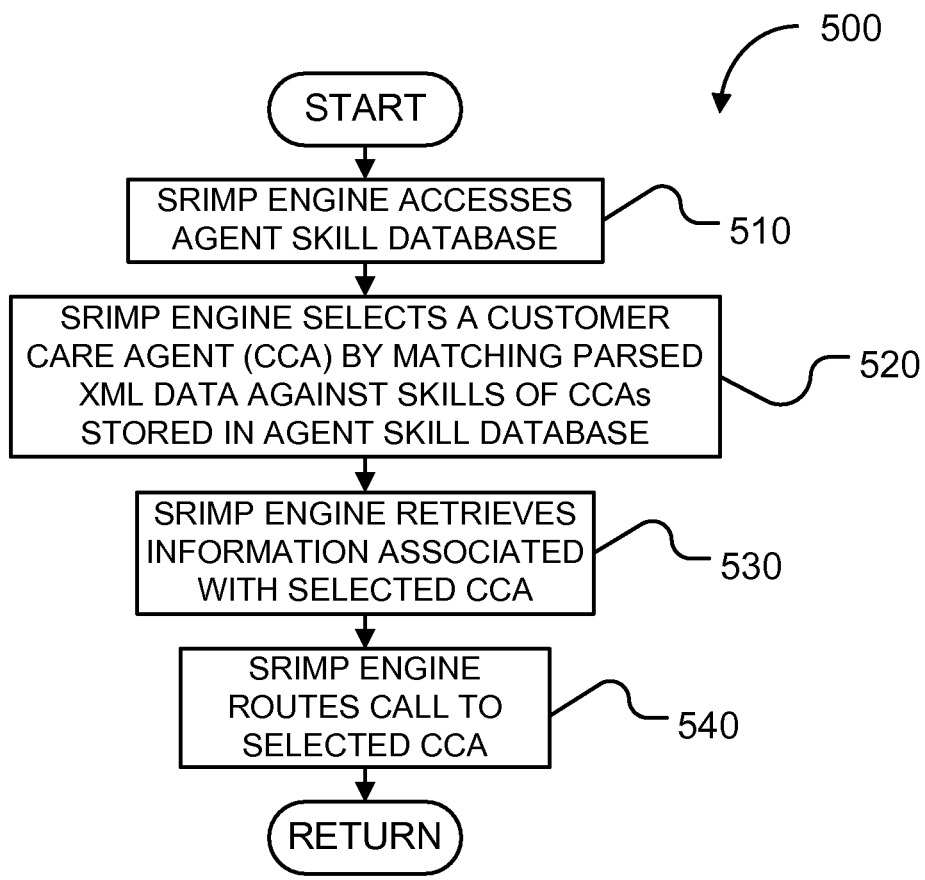
FIG. 5 is a flow diagram illustrating a call routing mechanism for routing calls in accordance with the preferred embodiments of the invention.

FIG. 5 is a flow diagram illustrating a call routing mechanism 500 for routing calls in accordance with the preferred embodiments of the invention. In the call routing mechanism 500, the steps discussed below (steps 510-540) are performed. These steps are set forth in their preferred order. It must be understood, however, that the various steps may occur at different times relative to one another than shown, or may occur simultaneously. Moreover, those skilled in the art will appreciate that one or more of the steps may be omitted. The call routing mechanism 500 begins as the SRIMP engine accesses the agent skills database (step 510). The call routing mechanism 500 continues as the SRIMP engine selects a customer care agent by matching one or more component parts of the parsed XML file (e.g., the customer's question or one or more key words hits in the customer's question, the customer's account type, etc.) against skills of the customer care agents stored in the agent skills database (step 520). Then, the call routing mechanism 500 continues as the SRIMP engine retrieves information associated with the selected customer care agent (step 530). For example, the call routing mechanism 500 may retrieve the telephone number of the selected customer care agent's contact information displayed in the "Insurance Agent Contact Information" portlet shown in FIG. 3. Finally, the call routing mechanism 500 continues as the SRIMP engine routes a call to the selected customer care agent (step 540) and the call routing mechanism 500 returns. Once the call is routed to the selected customer care agent, two-way verbal communication may be established between the selected customer care agent and the customer.

Figure 6:
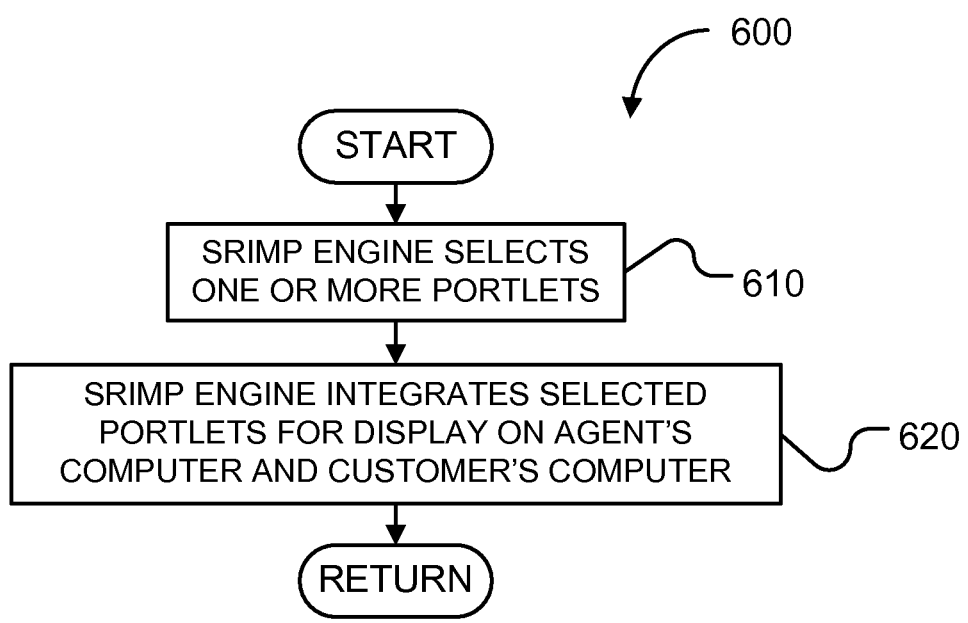
FIG. 6 is a flow diagram illustrating a portlet selection mechanism for selecting one or more portlets in accordance with the preferred embodiments of the invention.

FIG. 6 is a flow diagram illustrating a portlet selection mechanism 600 for selecting one or more portlets in accordance with the preferred embodiments of the invention. In the portlet selection mechanism 600, the steps discussed below (steps 610-620) are performed. These steps are set forth in their preferred order. It must be understood, however, that the various steps may occur at different times relative to one another than shown, or may occur simultaneously. Moreover, those skilled in the art will appreciate that one or more of the steps may be omitted. The portlet selection mechanism 600 begins as the SRIMP engine selects one or more portlets for display on the screen of the selected customer care agent's computer and/or customer's computer, the selection being based at least in part on one or more component parts of the parsed XML file (step 610). For example, the set of portlets shown in FIG. 3 may be selected when the customer's question relates to auto insurance, but a different set of portlets may be selected when the customer's question relates to home owner's insurance. Finally, the portlet selection mechanism 600 continues as the SRIMP engine integrates the selected portlets for display on the agent's computer and/or customer's computer (step 620) and the call routing mechanism 600 returns.

Figure 7:
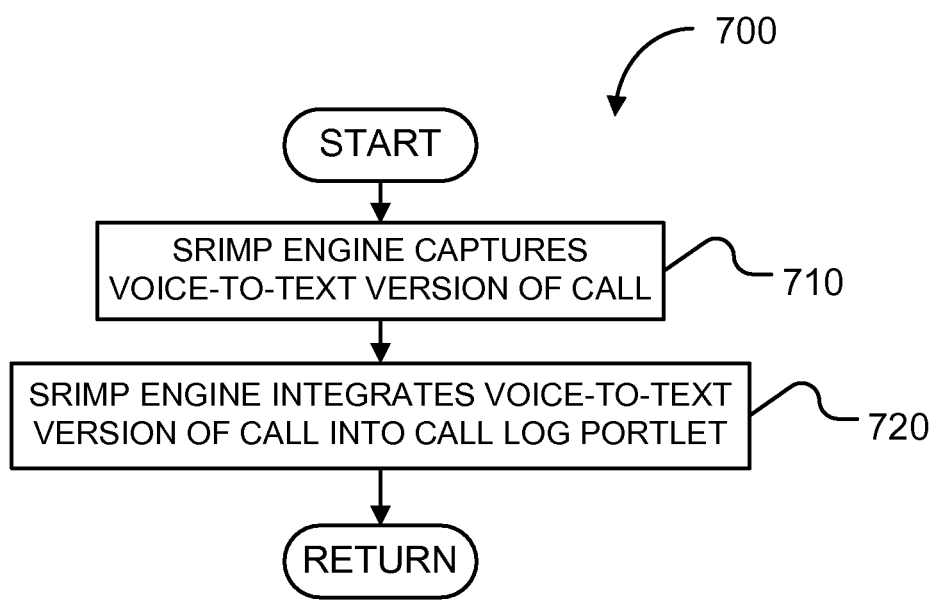
FIG. 7 is a flow diagram illustrating a call log mechanism for generating a call log in accordance with the preferred embodiments of the invention.

FIG. 7 is a flow diagram illustrating a call log mechanism 700 for generating a call log in accordance with the preferred embodiments of the invention. In the call log mechanism 700, the steps discussed below (steps 710-720) are performed. These steps are set forth in their preferred order. It must be understood, however, that the various steps may occur at different times relative to one another than shown, or may occur simultaneously. Moreover, those skilled in the art will appreciate that one or more of the steps may be omitted. The call log mechanism 700 begins as the SRIMP engine captures voice-to-text version of the call (step 710). Finally, the call log mechanism 70 continues as the SRIMP engine integrates the voice-to-text version of the call into a call log portlet for display on the agent's computer and/or customer's computer (step 720) and the call routing mechanism 600 returns. The call log mechanism 700 may also permit the customer care agent to edit the call log, which is preferably read-only by the customer.

One skilled in the art will appreciate that many variations are possible within the scope of the present invention. For example, while the preferred embodiments of the invention have been shown and described in the context of routing both a call and a computer interface, one skilled in the art will appreciate that the invention need not route both. The SRIMP engine may, for example, route a call to a customer care agent selected based on a data file without also routing a computer interface; or the SRIMP engine may select a customer care agent based on a data file and route a computer interface created using one or more components (e.g., portlets) selected based on the data file without also routing a call. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer-implemented method for intelligently routing a call and providing a supporting computer interface on a screen of each of a plurality of computers connected to a network, comprising the steps of:
   presenting a request prompt on a customer computer, the request prompt having one or more mechanisms by which a customer provides customer-input information;
   generating a data file with the customer-input information and transmitting the data file over a data network;
   receiving, via the data network, the data file;
   parsing the received data file into one or more component parts;
   routing a call to a customer care agent selected based on one or more of the parsed component parts of the data file, wherein the step of routing the call to the customer care agent selected based on one or more of the parsed component parts of the data file includes the step of routing a voice-over-internet protocol (VoIP) call to a telephony device of the selected customer care agent enabled with VoIP technology;
   selecting two or more agent's view portlets for inclusion in a set of agent's view portlets from among a plurality of portlets each having at least one from a group of textual, graphic, audio and video media, the two or more agent's view portlets being selected based on one or more of the parsed component parts of the data file;
   creating an agent's view computer interface the content of which is based on the data file for display on a screen of a computer of the selected customer care agent, wherein the step of creating the agent's view computer interface includes the step of integrating the set of agent's view portlets into the agent's view computer interface;
   selecting two or more customer's view portlets for inclusion in a set of customer's view portlets from among a plurality of portlets each having at least one from a group of textual, graphic, audio and video media, the two or more customer's view portlets being selected based on one or more of the parsed component parts of the data file;
   creating a customer's view computer interface the content of which is based on the data file for display on a screen of the customer's computer, wherein the step of creating the customer's view computer interface includes the step of integrating the set of customer's view portlets into the customer's view computer interface;
   capturing a voice-to-text version of the VoIP call, wherein the set of the agent's view portlets and the set of the customer's view s portlets each includes a call log portlet into which is integrated the voice-to-text version of the VoIP call, and wherein the call log portlet is editable by the customer care agent and read-only by the customer.

2. The computer-implemented method as recited in claim 1, further comprising the steps of:
   downloading the agent's view computer interface from a server to the selected customer care agent's computer;
   downloading the customer's view computer interface from the server to the customer's computer.

3. The computer-implemented method as recited in claim 1, wherein the customer's view computer interface includes an advertisement selected based on one or more of the parsed component parts of the data file.

4. The computer-implemented method as recited in claim 1, further comprising the step of:
   presenting a request button on a page of a web site to open a request form, and wherein the step of presenting a request prompt on a screen of a customer computer includes the step of presenting the request form in response to the customer selecting the request button.

5. The computer-implemented method as recited in claim 4, wherein the generating a data file with the customer-input information and transmitting the data file over a data network includes the steps of:
   presenting a submit button to submit the request form;
   generating an XML file with the customer-input information in response to the customer selecting the submit button, wherein the customer-input information comprises at least one of the customer's question, web page navigation history, name, address, telephone number, product identifier, service identifier, account number, account type, service level, credit card number, and debit card number;
   transmitting the XML file over the data network.

6. The computer-implemented method as recited in claim 5, wherein the step of receiving, via the data network, the data file includes the step of:
   receiving, over the data network, the XML file, and wherein the step of parsing the received data file into one or more component parts includes the step of:
   parsing the received XML file into one or more component parts representing at least one of the customer's question, web page navigation history, name, address, telephone number, product identifier, service identifier, account number, account type, service level, credit card number, and debit card number.

7. The computer-implemented method as recited in claim 6, wherein the step of routing a call to a customer care agent selected based on the data file includes the steps of:
   correlating at least one of the parsed component parts of the XML file against the skills of a plurality of customer care agents;
   selecting one of the customer care agents as the selected customer care agent based on the result of the correlating step.

8. The computer-implemented method as recited in claim 7, wherein the step of creating an agent's view computer interface the content of which is based on the data file for display on a screen of a computer of the selected customer care agent comprises the step of:
    integrating relevant customer history data, two or more relevant portlets, and relevant data-mined information into the agent's view computer screen, wherein the integrating step includes the steps of:
        locating the relevant historic customer data of the customer stored in a customer history database, the customer history database storing historic customer data for each of a plurality of customers, the relevant historic customer data being located based on at least one of the parsed component parts of the XML file;
        selecting the two or more relevant portlets from among a plurality of portlets, the two or more relevant portlets being selected based on at least one of the parsed component parts of the XML file;
        retrieving the relevant data-mined information stored in a data-mined information database, the data-mined information database storing data-mined information obtained via a data-mining operation, the relevant selected data-mined information being selected based on at least one of the parsed component parts of the XML file.

9. The computer-implemented method as recited in claim 1, wherein the step of selecting two or more agent's view portlets for inclusion in a set of agent's view portlets includes the steps of:
    if one or more of the parsed component parts of the data file identifies a first type of request, selecting a first agent's view portlet and a second agent's view portlet for inclusion in the set of agent's view portlets;
    if one or more of the parsed component parts of the data file identifies a second type of request different from the first type, selecting a third agent's view portlet and a fourth agent's view portlet for inclusion in the set of agent's view portlets, wherein the third and fourth agent's view portlets are different than the first and second agent's view portlets.

10. The computer-implemented method as recited in claim 1, wherein the step of selecting two or more customer's view portlets for inclusion in a set of customer's view portlets includes the steps of:
    if one or more of the parsed component parts of the data file identifies a first type of request, selecting a first customer's view portlet and a second customer's view portlet for inclusion in the set of customer's view portlets;
    if one or more of the parsed component parts of the data file identifies a second type of request different from the first type, selecting a third customer's view portlet and a fourth customer's view portlet for inclusion in the set of customer's view portlets, wherein the third and fourth customer's view portlets are different than the first and second customer's view portlets.

11. A data processing system for intelligently routing a call and providing a supporting computer interface on a screen of each of a plurality of computers connected to a network, comprising:
    a processor;
    a memory coupled via a bus to the processor, the memory encoded with instructions that when executed by the processor comprise the steps of:
        receiving a data file over a data network from a customer computer which generated the data file with customer-input information;
        parsing the received data file into one or more component parts;
        routing a call to a customer care agent selected based on one or more of the parsed component parts of the data file, wherein the step of routing the call to the customer care agent selected based on one or more of the parsed component parts of the data file includes the step of routing a voice-over-internet protocol (VoIP) call to a telephony device of the selected customer care agent enabled with VoIP technology;
        selecting two or more agent's view portlets for inclusion in a set of agent's view portlets from among a plurality of portlets each having at least one from a group of textual, graphic, audio and video media, the two or more agent's view portlets being selected based on one or more of the parsed component parts of the data file;
        creating an agent's view computer interface the content of which is based on the data file for display on a screen of a computer of the selected customer care agent, wherein the step of creating the agent's view computer interface includes the step of integrating the set of agent's view portlets into the agent's view computer interface;
        selecting two or more customer's view portlets for inclusion in a set of customer's view portlets from among a plurality of portlets each having at least one from a group of textual, graphic, audio and video media, the two or more customer's view portlets being selected based on one or more of the parsed component parts of the data file;
        creating a customer's view computer interface the content of which is based on the data file for display on a screen of the customer's computer, wherein the step of creating the customer's view computer interface includes the step of integrating the set of customer's view portlets into the customer's view computer interface;
        capturing a voice-to-text version of the VoIP call, wherein the set of the agent's view portlets and the set of the customer's view portlets each includes a call log portlet into which is integrated the voice-to-text version of the VoIP call, and wherein the call log portlet is editable by the customer care agent and read-only by the customer.

12. A computer program product for intelligently routing a call and providing a supporting computer interface on a screen of each of a plurality of computing devices each connected to a network and having a processor, comprising:
    a plurality of executable instructions recorded on non-transitory computer readable media, wherein the executable instructions, when executed by the processor, cause the digital computing device to perform the steps of:
        receiving a data file over a data network from a customer computer which generated the data file with customer-input information;
        parsing the received data file into one or more component parts;
        routing a call to a customer care agent selected based on one or more of the parsed component parts of the data file, wherein the step of routing a call to a customer care agent selected based on one or more of the parsed component parts of the data file includes the step of routing a voice-over-internet protocol (VoIP) call to a telephony device of the selected customer care agent enabled with VoIP technology;

selecting two or more agent's view portlets for inclusion in a set of agent's view portlets from among a plurality of portlets each having at least one from a group of textual, graphic, audio and video media, the two or more agent's view portlets being selected based on one or more of the parsed component parts of the data file;

creating an agent's view computer interface the content of which is based on the data file for display on a screen of a computer of the selected customer care agent, wherein the step of creating the agent's view computer interface includes the step of integrating the set of agent's view portlets into the agent's view computer interface;

selecting two or more customer's view portlets for inclusion in a set of customer's view portlets from among a plurality of portlets each having at least one from a group of textual, graphic, audio and video media, the two or more customer's view portlets being selected based on one or more of the parsed component parts of the data file;

creating a customer's view computer interface the content of which is based on the data file for display on a screen of the customer's computer, wherein the step of creating the customer's view computer interface includes the step of integrating the set of customer's view portlets into the customer's view computer interface;

capturing a voice-to-text version of the VoIP call, wherein the set of the agent's view portlets and the set of the customer's view portlets each includes a call log portlet into which is integrated the voice-to-text version of the VoIP call, and wherein the call log portlet is editable by the customer care agent and read-only by the customer.

* * * * *